United States Patent [19]

Basora San Juan

[11] Patent Number: 4,972,768

[45] Date of Patent: Nov. 27, 1990

[54] TOASTER

[75] Inventor: Antonio Basora San Juan, Barcelona, Spain

[73] Assignee: Moulinex (Societe Anonyme), Bagnolet, France

[21] Appl. No.: 516,669

[22] Filed: Apr. 30, 1990

[30] Foreign Application Priority Data

Apr. 28, 1989 [FR] France .................. 89 05746

[51] Int. Cl.$^5$ .............................................. A47J 37/08
[52] U.S. Cl. ........................................ 99/391; 99/393
[58] Field of Search .............. 99/329 R, 349, 329 RT, 99/385, 388, 389, 390, 391–393, 400, 426, 427; 219/411, 413, 492

[56] References Cited

U.S. PATENT DOCUMENTS

| | | | |
|---|---|---|---|
| 1,596,081 | 8/1926 | Coleman | 99/391 |
| 2,260,043 | 10/1941 | Middleton et al. | 99/391 |
| 2,724,322 | 11/1955 | Parr | 99/327 |
| 2,920,550 | 1/1960 | Schmall | 99/391 |
| 3,531,231 | 9/1970 | Kawamura | 99/393 |
| 3,636,858 | 1/1972 | Paaskesen | 99/391 |
| 3,789,749 | 2/1974 | Paaskesen | 99/391 |
| 3,869,970 | 3/1975 | Eagle | 99/329 R |

Primary Examiner—Timothy F. Simone
Attorney, Agent, or Firm—Young & Thompson

[57] ABSTRACT

Toaster comprising a housing (1) having an upper opening (2) and in the interior of which are disposed at least one heating resistance (3). Two grills (5, 6) for gripping a bread slice to be toasted, are maintained in rest position spaced from each other by a spring (7) and swing each about a lower horizontal axis (8, 9). A bread-carrying carriage (10) is movably vertically mounted between the two grills (5, 6) and is adapted to occupy two positions, an upper position in which the carriage (10) is located in the upper portion of the housing (1), and a toasting position in which the carriage (2) has descended to the bottom (11) of the housing (1) and coacts with the grills (5, 6) to cause them to swing toward each other, so as to maintain the bread gripped, characterized in that each grill (5 or 6) has at its lower portion a rigid arm (13, 14) directed toward the other grill (5 or 6). The two ends (15, 16) of these arms (13, 14) cross in the rest position of the grills (5, 6), whereby when the carriage (10) reaches its toasting position, a lower portion of the carriage (10) bears against said ends (15, 16) at the level of their crossing region (18), thereby exerting a centered force opposed to that exerted by the spring (7), so as to cause the swinging of the grills (5, 6) toward each other.

6 Claims, 1 Drawing Sheet

TOASTER

The present invention relates to a toaster comprising a housing having an upper opening and in the interior of which are disposed at least a heating resistance, two grills for gripping a bread slice to be toasted, maintained in rest position spaced from each other by resilient means adapted to swing each about a lower horizontal axis, and a bread carriage movably vertically mounted between the two grills.

The invention relates more particularly to a toaster whose carriage can occupy two positions, an upper position in which the carriage is situated in the upper portion of the housing, and a toasting position in which the carriage has descended to the bottom of the housing and coacts with the grills to make them swing toward each other so as to maintain the bread gripped.

In toasters of this type more or less reliable devices are used to ensure the coaction between the carriage and the grills, for example several springs of more or less complicated shape. These devices have the drawback, either of not correctly centering the bread slice relative to the heat source, or of not compensating for the thickness of the bread, or, in case a grill does not swing upon the descent of the carriage, of gripping the bread only on one side. These drawbacks result in the bread slice more toasted on one side than the other, and thus burned.

The invention has for its object to overcome these drawbacks by providing a toaster such as that the coacting mechanism between the carriage and the grills will be particularly simple, economical and reliable.

According to the invention, each grill has in its lower portion a rigid arm directed toward the other grill, the two ends of these arms being adapted to cross in the rest position of the grills, whereby, when the carriage reaches its toasting position, a lower portion of the carriage will bear against said ends at the level of the region of their crossing, thus exerting a force which is centered and opposed to that exerted by the resilient means, thereby to effect the swinging of the grills toward each other.

The invention thus has for an advantage the provision of a device permitting automatic centering of the bread between the grills thanks to their symmetrical swinging, no matter what the thickness of the bread.

The characteristics and advantages of the invention will become more apparent from the description which follows, by may of example, with reference to the accompanying drawing, in which.

Figure 1:
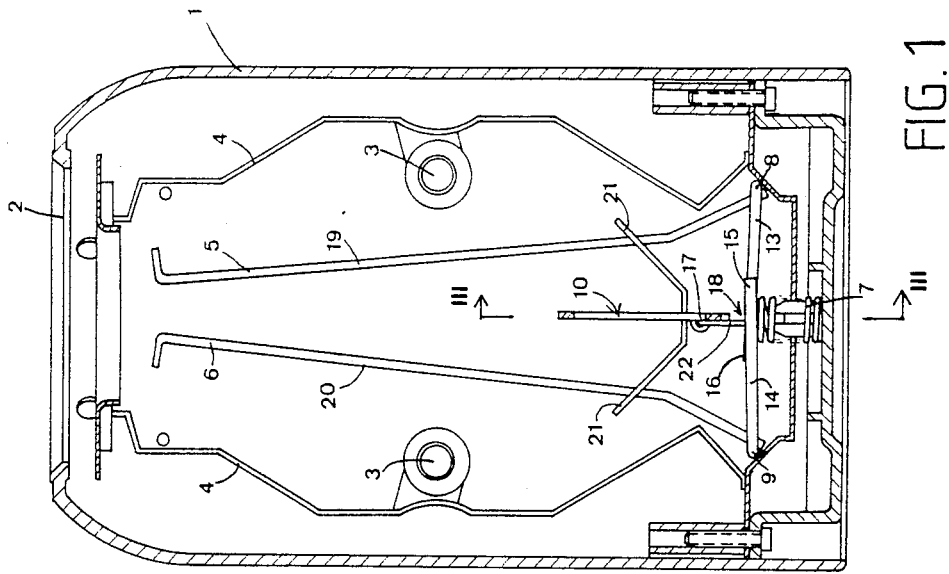
FIG. 1 is a vertical cross section of the toaster according to the invention showing the toasting position.
Figure 2:
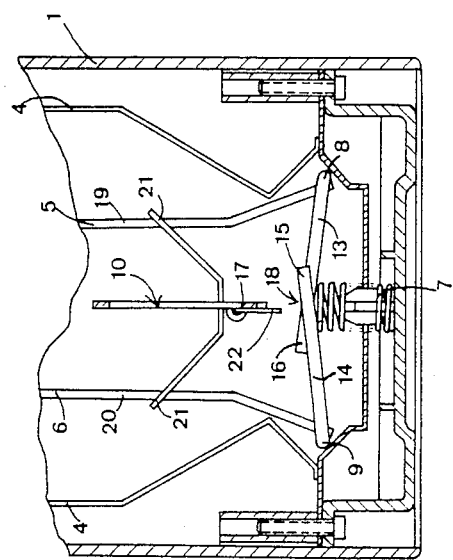
FIG. 2 is a partial vertical cross section of the toaster according to the invention showing the grills in the rest position.

The toaster shown in FIGS. 1 and 2 comprises a housing 1 having an upper opening 2 for the passage of slices of bread and in the interior of which are disposed two heating resistances 3, heat reflectors 4, two grills 5, 6 for grasping a slice of bread to be toasted, maintained in rest position (FIG. 2) spaced from each other by resilient means 7 constituted by a coil spring and adapted each to swing about a lower horizontal axis 8, 9 called a swinging axis (FIG. 1). The grill comprises also a bread carrying carriage 10 mounted movably vertically between the two grills 5, 6. The carriage 10 can occupy two positions, an upper position (not shown) in which the carriage 10 is situated in the upper part of housing 1, and a toasting position (FIG. 1) in which the carriage 10 has descended to the bottom of the housing 1 and coacts with the grills 5, 6 to cause them to swing toward each other, so as to maintain the bread gripped.

The carriage 10 is moved from its upper position to its toasting position by the user. In the toasting position, it is retained by a latching mechanism (not shown) comprising a timing device which controls the heating resistances 3. At the end of the toasting period, the timing device cuts off the resistances 3 and unlatches the carriage 10, which is returned to the upper position by a return spring 12 (FIG. 2 shows the carriage 10 in a position intermediate the two positions).

According to the invention, each grill 5 or 6 has at its lower portion a rigid arm 13, 14 directed toward the other grill 5 or 6, the two ends 15, 16 of these arms 13, 14 being adapted to cross in the rest position of the grills 5, 6, such that, when the carriage 10 arrives in its toasting position, a lower portion of the carriage 10 will come to bear against these ends 15, 16 at the level of the region 18 of their crossing, thereby exerting a centered force which is opposed to that exerted by the spring 7, so as to cause the swinging of the grills 5, 6 toward each other by a lever action.

The spring 7 is disposed between the bottom of the housing 1 and the region 18 of crossing of the ends 15, 16 of the arms 13, 14 so as to exert an upward force. Thus, the lowermost coil of spring 7 rests on the bottom of housing 1, while the uppermost coil presses directly against the ends 15, 16 of the arms 13, 14 in the region 18 of their crossing. The crossing region 18 is situated at a level higher than the swinging axes 8, 9, to make room in the bottom of the housing 1.

Thanks to this arrangement, the grills, 5, 6 being symmetrical, the bread is automatically centered because the force exerted by the carriage 10 is divided equally between the two arms 13, 14 and hence the grills 5, 6 swing symmetrically toward each other. So as to obtain good lever action, each arm 13, 14 is connected to the grill 5, 6 at the level of the horizontal swinging axis 8, 9. To provide a particularly simple construction, the arm 13, 14 and the axis 8, 9 of each grill 5, 6 are formed from a single piece by an elbowed filament and vertical rods 19, 20 are welded on each axle 8, 9. The two grills are symmetrically arranged relative to the vertical plane of displacement of the carriage 10. Each grill 5, 6 is connected to the housing 1 solely at the level of its swinging axis 8, 9. Thus, an upper portion of each grill 5, 6 is not guided in the housing 1, but swings freely about the axis 8, 9.

Figure 3:
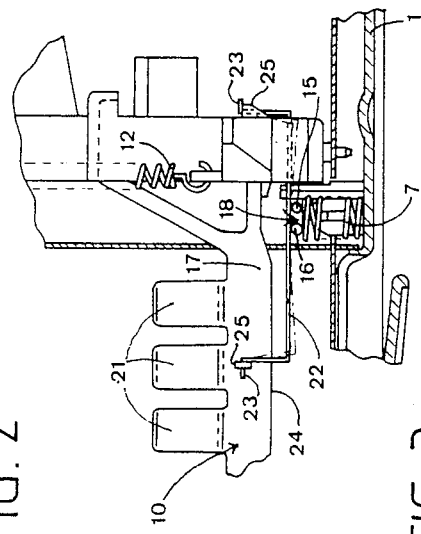
FIG. 3 is a fragmentary transverse cross sectional view on the line III—III of FIG. 1.

As shown in FIG. 3, the upper portion of the carriage 10 comprises a series of flared wings 21 adapted to receive the bread slice while the lower portion of the carriage 10 is constituted by a horizontal crosspiece 17 disposed in a vertical plane, and bears on the ends 15, 16 of the arms 13, 14 by means of a resilient device 22 constituted by a metal wire of the piano string type, of U-shape, whose two ends 23 are secured to the crosspiece 17 and whose middle portion is stretched and disposed parallel to the lower edge 24 of the crosspiece 17 and at a distance from the latter. The metallic wire 22 is moreover removably mounted by hooking its extremities 23 in eyelets 25 of the crosspiece 17, so that its replacement when necessary will be rapid and easy.

The resilient device 22 has for its object elastically to compensate the thickness of the bread slice. Thus, when the carriage 10 descends and comes to bear on the ends 15, 16 of the arms 13, 14, it exerts a downwardly directed force, opposed to that of the coil spring 7 until the carriage 10 is blocked by the latching mechanism. Moreover, if the bread is very thick, it prevents the grills 5, 6 from swinging completely, adding a supplemental upwardly directed force at the crossing level 18 of the arms 13, 14, thereby preventing the carriage 10 from descending completely and from being blocked by the latching mechanism. To avoid that, the middle portion of the wire 22 is vertically deformed in the arc of a circle (shown in broken lines in FIG. 3), the thicker is the bread, permitting the carriage 10 to descend completely while adjusting the gripping of the grills 5, 6 to the thickness of the bread.

The middle portion of the wire can also deform slightly laterally in case the swinging of one of the grills 5, 6 is prevented. Thus, when the carriage 10 descends toward its toasting position and bears against the ends 15, 16 of the arms 13, 14, if one of the grills 5, 6 is blocked in the rest position, the corresponding arm 13, 14 will remain inclined and will hinder the descent of the carriage 10 which can take place only in a vertical plane, thereby hindering its latching in the toasting position. Thanks to the lateral deformation of the wire 22, the carriage 10 can continue its descent until latched.

What is claimed is:

1. In a toaster comprising a housing (1) having an upper opening (2) and in the interior of which are disposed at least one heating resistance (3), two grills (5, 6) for gripping a bread slice to be toasted, maintained in rest position spaced from each other by resilient means (7) and adapted to swing each about a lower horizontal axis (8, 9), and a bread-carrying carriage (10) movably vertically mounted between the two grills (5, 6) and adapted to occupy two positions, an upper position in which the carriage (10) is located in the upper portion of the housing (1), and a toasting position in which the carriage (2) has descended to the bottom (11) of the housing (1) and coacts with the grills (5, 6) to cause them to swing toward each other, so as to maintain the bread gripped; the improvement in which each grill (5 or 6) has at its lower portion a rigid arm (13, 14) directed toward the other grill (5 or 6), the two ends (15, 16) of these arms (13, 14) being adapted to cross in the rest position of the grills (5, 6), whereby when the carriage (10) reaches its toasting position, a lower portion of the carriage (10) bears against said ends (15, 16) at the level of their crossing region (18), thereby exerting a centered force opposed to that exerted by the resilient means (7), so as to cause the swinging of the grills (5, 6) toward each other.

2. Toaster according to claim 1, wherein the resilient means (7) are constituted by a spring interposed between the bottom of the housing (1) and the crossing region (18) of the ends (15, 16) of the arms (13, 14) so as to exert an upward force.

3. Toaster according to claim 1, wherein the lower portion of the carriage (10) bears against the ends (15, 16) of the arms (13, 14) by means of a resilient device (22).

4. Toaster according to claim 3, wherein the lower portion of the carriage (10) being constituted by a horizontal crosspiece (17) disposed in a vertical plane, the resilient device (22) is constituted by a metallic wire whose two ends (23) are secured to the crosspiece (27) and whose middle portion is stretched and disposed parallel to the lower edge (24) of the crosspiece (17) and at a distance from the latter.

5. Toaster according to claim 1, wherein each arm (13, 14) is connected to the grill (5, 6) at the level of the horizontal swinging axis (8, 9).

6. Toaster according to claim 1, characterized in that each grill (5, 6) is connected to the housing (1) solely at the level of its swinging axis (8, 9).

* * * * *